Patented Dec. 31, 1935

2,025,985

UNITED STATES PATENT OFFICE 2,025,985

CONFECTION

Benjamin R. Harris, Chicago, Ill.

No Drawing. Application February 12, 1934,
Serial No. 710,893

14 Claims. (Cl. 99—16)

My invention relates to candy confections. It relates more in particular to the improvement of candy confections of a type wherein a comminuted material, including sugar, is combined with a fat, as, for example, in chocolate, chocolate-like coatings for candy, ice cream, cookies, and other confections, toffees, caramels, icings, fillings, fudges, butter creams, and other compositions of this class, the determinants of which will be more fully identified throughout the specification.

For an understanding of the problems and advantages of the present invention, reference may be had to so-called chocolate enrobing compositions. Here there is a specific problem in producing a chocolate enrobing composition having a suitable viscosity at a temperature at which the material can be conveniently worked. Attention must also be given to retaining a suitable viscosity for a sufficient period to facilitate commercial manipulations. It is known that viscosities can often be reduced by increasing the fat content, but in general this particular approach of the problem is not satisfactory, as those skilled in the art understand. Similar problems exist in the manufacture and use of icings wherein powdered sugar and fat usually are employed.

In the manufacture of certain other confections, such as toffees, caramels, fudges, and the like, fatty ingredients are heated at a high temperature with comminuted solids, such as sugar, in the presence of relatively small amounts of moisture, and it is necessary to have an emulsifying agent in order to maintain a stable emulsion at the high temperature. In the preparation of cooked toffee, for example, a temperature of about 285° F. is employed to reduce the moisture content of the syrup.

The principal object of the invention is to improve confections of the general character described.

Another object is the provision of a new ingredient for use in compositions of the character outlined.

Another object is to reduce the viscosity of confections of the general character indicated by the incorporation therewith of relatively small amounts of an improved addition substance.

A further object is the utilization of an improved emulsifying agent in toffees and the like which are heated at a relatively high temperature.

Other objects and features of the invention will be apparent as the detailed description thereof progresses.

I have discovered that I can produce significant improvements in the reduction of viscosities and in other ways by employing in compositions of the character outlined relatively small proportions of certain interface modifiers of the character described in my co-pending application, Serial No. 705,825, filed January 8, 1934, but which I shall also refer to herein in a later part of the specification. It may be stated generally at this time, however, that these materials are in general modified lipins in that the lipophile group is linked to a phosphate hydrophillic group of a character hereinafter to be more fully identified. The amount of these materials employed is of the order of ¼ to 3% on the basis of the fat used, although lesser and greater amounts can be employed if desired.

The character of improvement effected by the introduction of my interface modifiers naturally varies with the composition of matter at hand. For example, in a conventional chocolate mix, such as 148 parts of powdered sugar (6X cane sugar), 52 parts of cocoa powder (12% fat content), 100 parts of cocoa butter, and flavoring, the principal improvement is a substantial reduction in viscosity. In a conventional toffee, for example, consisting of 60 parts of coconut stearine, 140 parts of 4X sugar, 20 parts of invert sugar, and 20 parts of water, wherein the mix is boiled at about 285° F., and the fat must emulsify and remain emulsified at this relatively high temperature, the improvement is largely one in the ease of emulsification and the stability of the emulsion obtained. In still other preparations, additional improvements are found such as in the character of texture, appearance, and/or flavor, but it is to be noted that in every instance, whatever the character of the improvement at hand, the physical chemical mechanism is one of interface modification effected by the introduction of the class of interface modifiers which I employ herein.

The interface modifiers of my invention may be described by referring to the process of making them. In general, the preparation consists preferably in reacting a more or less lipophile material with at least one free hydroxy group, for example, a di-glyceride or a mixture of di-glycerides with phosphorus pentoxide (or some other form or derivative of phosphoric acid, such as meta-phosphoric acid, pyro-phosphoric acid, phosphorus oxychloride, phosphorus pentachloride, ethyl metaphosphate, and other phosphorus reagents capable of forming esters of phosphoric acid), to yield an ester of phosphoric acid with hydrophile properties and with strong lipophile properties. Examples A, B, C, and D, will serve to illustrate my general method for the preparation of some of the interface modifiers with the use of which the present invention is concerned.

Example A 175 parts of refined deodorized cottonseed oil are heated with 10 parts of glycerine (United States Pharmacopoeia grade) in an inert, that is, non-oxidizing atmosphere, with stirring, to about 200° C. .17 part of flaked caustic soda is then added with stirring, the temperature raised to about 250° C., and maintained at this temperature with continuous stirring for about two hours, and cooled to room temperature in an inert atmosphere.

45 parts of the above product, which consists essentially of a mixture of diglycerides, and 3 parts of finely divided phosphorus pentoxide are mixed at a temperature of about 50° to 60° C., and then heated with vigorous stirring in a substantially dry, inert atmosphere to about 115° to 120° C., or, if desired, somewhat higher, and maintained at this temperature for two to three hours.

The reaction mixture is then allowed to remain at rest and to cool in an inert atmosphere. A small proportion of insoluble matter settles to the bottom of the container and while the mixture is still liquid, it is poured off from the sediment. The decanted material may be used as such or it is further chilled until it is semi-solid and plastic, and 50% aqueous sodium hydroxide solution is added gradually, with stirring, in sufficient proportion to render the product preferably substantially neutral to litmus, though the product may be left slightly acid or faintly alkaline to litmus. The amount of sodium hydroxide solution to be added is determined as follows:

A 2 gram sample of the material to be neutralized is dissolved in about 10 c. c. of neutral ethyl ether. 15 c. c. of neutral isopropyl alcohol are added and then 150 c. c. of distilled water are stirred in. The mixture is then titrated with $\frac{1}{10}$ normal sodium hydroxide solution, using phenolphthalein as indicator. From this titration the amount of caustic soda solution required is computed.

The product obtained consists principally of esters of phosphoric acid in the form of a light colored, pasty material with valuable interface modifying properties along the lines discussed hereinabove.

The reaction with phosphorus pentoxide described herein under Example A, is susceptible to considerable variation as to the proportion of phosphorus pentoxide used, the temperature and the duration of contact between the fatty material and the phosphorus pentoxide. In general, each of these three factors stand in reciprocal relation to the other two, that is to say, other things being equal, the greater the proportion of phosphorus pentoxide, the shorter the time of contact and/or the lower the temperature of reaction required to obtain a given result. Or, to state another reciprocal relation, the higher the temperature of reaction, other things being equal, the shorter the duration of contact and/or the lower the proportion of phosphorus pentoxide required to obtain a given result.

However, these reciprocal relations are valid only within certain reasonable limits. For example, while at temperatures below 105° C. some reaction does occur, it is very slow, so that to get appreciable interface modifying potency in the product, the time of contact would be so long and the proportion of phosphorus pentoxide required so high as to make such a procedure extremely inconvenient, in many instances.

On the other hand, the employment of temperatures substantially higher than 140° C. in general tends to reduce the potency of the product and discolor and char it, especially so when higher proportions of phosphorus pentoxide or longer times of contact are employed. The temperature factor is particularly important in relation to the phosphorus pentoxide reaction because of the fact that this reaction is decidedly exothermic. It is evident, therefore, that while considerable latitude is permissible in the proportion of phosphorus pentoxide, in the temperature range of the reaction, and in the time of contact of phosphorus pentoxide with fatty material, certain criteria as to the inter-relationship of these three factors must be observed to secure high interface modifying potencies in the product obtained.

Notwithstanding this, however, even though the reaction be subjected to considerable, even indiscriminate, variation in the three factors indicated, the products obtained will still possess interface modifying properties such as those described herein. To be sure, in order to obtain high or outstanding potency with respect to such interface modifying properties, those skilled in the art will appreciate the importance of carefully adjusting the conditions of the reaction, particularly with respect to the three factors designated. An illustration of such preferred conditions is carefully specified hereinabove in Example A. In all cases, however, the products obtained comprise esters of phosphoric acid interfacially active in fatty compositions falling into the class with which the present invention deals and the determinants of which are referred to at various points of this specification.

Example B

Cocoa butter is treated by the same procedure, with the same proportions successively of glycerine and phosphorus pentoxide and other materials, and under the same conditions of time, temperatures and stirring as described in Example A hereinabove. The product obtained consists primarily of esters of phosphoric acid, somewhat firmer in texture and darker in color than the product obtained in Example A, but has substantially the same interface modifying properties.

In practice I carry out my invention by taking the resultant phosphorus pentoxide reaction product of Example A and combining ½% on the basis of the fat used in the chocolate mix, together with the other ingredients, preferably by first melting the interface modifier with the fat into a homogeneous dispersion. Smaller proportions such as, for example, ¼% of a good, potent product as in Example A, may be used to obtain reduction in viscosity and a saving in the fat in the chocolate mix. Larger proportions may be used, if desired, as high as 1% or higher; however, ½% is sufficient from a practical standpoint.

I may also disperse larger proportions of the phosphoric acid esters prepared as shown above in fats. Thus for example I may make a dispersion of 50% of the phosphoric acid reaction product with 50% of cocoa butter or hydrogenated fat or coconut stearine and vend same as such. A proportionate amount of this fatty composition may be used to introduce in a chocolate mix to improve the chocolate mix by reducing its viscosity at desirable temperatures, as shown by the above examples.

In place of neutralizing the reaction mixture with sodium hydroxide, I may neutralize it with other alkalies, such as for example, lime, anhydrous sodium carbonate, or ammonia gas. In this case, the phosphoric acid ester of the glyceride used in this invention will not contain any nitrogen attached to carbon, but the nitrogen of the ammonia will be attached to the phosphorus, through oxygen.

In Example A or Example B given above, larger percentages of phosphorus pentoxide may be used, such as 25% on the basis of the glyceride and a very good, potent product will be obtained under the conditions specified. On the other hand, as low as 1% of phosphorus pentoxide may be used to react, but higher temperatures will be necessary in order to obtain a product of some potency.

In neutralizing the ester with the sodium hydroxide solution, the resultant product will contain small amounts of moisture, from about 2% to 5%, depending upon the amount of moisture introduced by the solution of the alkali.

Example C 100 parts of oleic acid (commercially pure) of good color, odor and taste, are heated with 100 parts of glycerine (U. S. Pharmacopoeia grade) to 220° C. with stirring in an inert, that is, non-oxidizing, atmosphere, and the mixture is maintained at this temperature with continuous stirring, in an inert atmosphere, for approximately two hours, until the free fatty acid content of the oil is about ½% or less. The mixture is now allowed to remain at rest and to cool in an inert atmosphere and the excess of glycerine is drawn off from the supernatant layer.

71 parts of the supernatant layer and 56½ parts of oleic acid (commercially pure) are heated with stirring at a temperature of 240° to 250° C., (substantially dry, inert gas being vigorously bubbled through the mixture simultaneously), for approximately four hours, until the free fatty acid content of the mixture is approximately ½ of 1% or less. The product is now cooled in an inert atmosphere.

100 parts of this product, which consists essentially of a mixture of diglycerides, dissolved in 300 parts of isopropyl ether, are refluxed for two hours with 25 parts of finely divided phosphorus pentoxide, care being taken to exclude moisture from contaminating the reaction mixture.

The mixture is cooled, insoluble material is filtered off, the ether is evaporated off and the product, which consists essentially of esters of phosphoric acid, may be used as such or it may be neutralized with alkaline agents such as sodium hydroxide, sodium carbonate or the like.

Modified glycerides, for purposes of reaction with phosphorus pentoxide, in order to secure interfacially active esters of phosphoric acid for the purposes of my invention, may be obtained not only from the oils and fats mentioned in Examples A, B and C, hereinabove, but also by the methods described in the aforementioned examples and by other methods, from fatty materials such as corn oil, sesame oil, sunflower oil, lard, beef tallow, mutton tallow, hydrogenated cottonseed oils and other hydrogenated oils and fats, peanut oil, palm oil, mixed fatty acids obtained by hydrolysis of fats and oils mentioned herein; commercial stearic acid, palmitic acid, melissic acid, caprylic acid, lauric acid, myristic acid, oleic acid, cerotic acid and other fatty materials capable of reacting with glycerine and other polyhydric alcohols.

Example D 80 parts of finely divided phosphorus pentoxide are stirred into a solution of 100 parts of monostearine dissolved in 1000 parts of isopropyl ether (free of moisture and alcohol). This mixture is continually stirred and heated sufficiently under a reflux condenser to maintain it substantially at the boiling point of the mixture, for two hours. The batch is now cooled to room temperature. The ether, which contains the principal portion of the reaction product in solution, is decanted from the undissolved material. The ether is distilled off and the residue is aerated to drive off the remaining small proportion of ether. The product consists essentially of esters of phosphoric acid in the form of a white, pulverizable solid with high potency with respect to the interface properties discussed hereinabove.

Many other more or less lipophile materials which have at least one unesterified hydroxy group capable of reacting with phosphorus pentoxide, may be converted into my interface modifiers by the methods described herein, particularly in Example D, in general, by causing approximately equal weights of phosphorus pentoxide to react with the organic substance in the presence of a solvent such as isopropyl ether. Other solvents may be used and the proportion of phosphorus pentoxide is subject to considerable variation, subject to the limitations discussed at great length hereinabove. In all cases interfacially active esters of phosphoric acid possessing a lipophile group and a hydrophile phosphate group are obtained.

The physical properties of the product, such as color and consistency, depend a great deal upon the starting material. Melissyl alcohol, for example, gives a rather hard, dark phosphate ester, whereas cetyl alcohol produces a pasty material of a dark color. The solubility or dispersibility in oils and fats also varies with the relationship of the lipophile group to the hydrophile phosphate group. The more potent materials produce noticeable interfacial effects in proportions as small as ¼ to ½%. Examples of the more or less lipophile materials possessing at least one hydroxy group reactive to phosphorus pentoxide, which are suitable for the purposes of my invention, in addition to those already mentioned herein, are as follows:

Hexyl alcohol, octyl alcohol, dodecyl alcohol, myristyl alcohol, octadecyl alcohol, ceryl alcohol, melissyl alcohol, castor oil, mono fatty acid esters of ethylene glycol, mono fatty acid esters of diethylene glycol, mono fatty acid esters of glycerine, fatty acid esters of polyglycerols with at least one hydroxy group reactive to phosphorus pentoxide, cetyl glycerol ether, lauryl ethylene glycol ether, myristyl diethylene glycol ether, other alkyl ethers with at least one hydroxy group reactive to phosphorus pentoxide, and other more or less lipophile substances with at least one hydroxy group reactive to phosphorus pentoxide. All of these materials give reaction products with phosphorus pentoxide which are esters of phosphoric acid with a hydrophile phosphate group and with marked interfacial activity of the kind discussed at great length hereinabove.

My interface modifiers may be dried or further purified, decolorized or deodorized, or diluted by incorporation of oils or fats, or otherwise treated.

My interface modifiers, in addition to functioning in the manner described at length hereinabove, also have marked emulsifying properties, particularly for water in oil emulsions and in many cases, to varying extents, they possess antispattering functions of the kind described at great length in United States Patent No. 1,917,256. These interface modifiers disperse readily in oils, fats, waxes and other fatty materials, particularly when the temperature is properly selected with cognizance of the melting point of the interface modifier as well as the melting point of the fatty material in which it is to be distributed.

As one example of the advantages to be obtained from the use of my invention, a conventional chocolate mix may be considered. 100 c. c. of a given chocolate mix composition was found to require about 85 seconds at 43° C. to flow through a given orifice. In making a test of this character, the mix is milled warm according to the usual custom for about 15 minutes and then allowed to cool down to about 43° C., at which temperature the test is made. About ¼% of one of the materials of my invention, when added to such a mix and thoroughly dispersed therethrough, will reduce the time of flow to 45 seconds, all conditions remaining the same.

This reduction of viscosity, of course, may be taken advantage of in various ways and may also be employed for the purpose of economizing in the proportion of fat required. That is to say, a given viscosity may be obtained, other things being equal, with a substantially smaller proportion of fat ingredient.

The most desirable manner of incorporating the interface modifiers of my invention is to dissolve them in the fat content of the confection in which they are to be used. The usual fats employed are cocoa butter, so-called pressed butters, coconut stearine, palm kernel oil stearine, dairy butter, hydrogenated oils and other oils, fats and fatty materials.

The invention has been considered from the standpoint of reduction in viscosity, but many other improvements manifest themselves in various forms to those skilled in the art to which the invention relates. For example, the improvements effected make possible lower enrobing temperatures; they make possible longer cooling periods, thereby permitting longer time in tunnels; greater range of working temperatures on the enrobing machine is possible; tempering is more uniform and gradual; in the cooking of toffees, by virtue of the fact that a far superior and a much more stable emulsion is obtained, the cooking is more flexible and tolerates considerably more abuse and variation than heretofore, without detrimental effects on the ultimate product; the tendency to "blooming" is considerably diminished and delayed. In many instances additional desired characteristics inure to the products concerned, by virtue of the diminished fat content.

A valuable feature of the products of my present invention is that they can be produced in the form of a substantially impalpable powder, and are therefore conveniently and readily incorporated into products of the character described. For example, many of the products of my invention may be sprayed into a cold atmosphere whereby the finely divided material of the spray is congealed and takes substantially a powder-like form. Still other ways of producing the substances in a convenient and desirable condition for use can be used.

Throughout this specification, I have employed the term "lipophile" to designate organic radicals with fatty characteristics. In general, such radicals consist primarily of carbon and hydrogen although they may include ether and/or ester linkages. I have employed this term "lipophile" to denote that the radical so designated has a distinct affinity for oils, fats, waxes and other fatty materials, and imparts a tendency to the molecule of which it is a part, to be wetted by fatty materials.

I have employed the term "hydrophile" throughout this specification primarily to denote properties antithetical to the "lipophile". In counter-distinction to the "lipophile" radicals, the "hydrophile" radicals consist primarily of hydrogen and oxygen and the "hydrophile" characteristics are imparted primarily by hydroxy groups attached to carbon or phosphorus. The hydrophillic character manifests itself by an affinity for water and aqueous media, and the hydrophile radical imparts to the molecule of which it is a member, a tendency to be wetted by water and aqueous media. The degree or extent of the hydrophillic character is dependent upon the number of hydroxy groups and their location in the molecule, and is also influenced by the number and character of lipophile groups with which they are associated in the molecule.

What I claim as new and desire to protect by Leters Patents of the United States is:

1. A confection composition comprising a comminuted material including a sugar dispersed in a fat and including a phosphoric acid ester of an organic polyhydroxy substance wherein a hydrogen of at least one hydroxy group is replaced by a higher molecular weight lipophile group, said ester being hydrophillic in character and devoid of nitrogen linked directly to carbon.

2. A confection composition comprising a comminuted material including a sugar dispersed in a fat and including a higher molecular weight ester of phosphoric acid, with a lipophile radical and at least one hydrophile phosphate group and devoid of nitrogen linked directly to carbon.

3. A confection composition comprising a comminuted material including a sugar dispersed in a fat and including a higher alkyl ester of phosphoric acid, with at least one hydrophile phosphate group and devoid of nitrogen linked directly to carbon.

4. The method of improving compositions of matter of a class consisting of chocolate-like coatings for confections, including candy creams, cookies and ice cream, chocolate confections, icings, fillings, fudges, butter creams, caramels and toffees, which comprises dispersing in said materials a proportion of a non-nitrogenous ester of phosphoric acid having a relatively high molecular weight lipophile group and a hydrophillic phosphate group.

5. A confection composition including cocoa powder, fat and an improving agent in the form of a phosphoric acid ester of an organic polyhydroxy substance wherein a hydrogen of at least one hydroxy group is replaced by a relatively high molecular weight lipophile group, said ester being devoid of nitrogen linked directly to carbon, and said confection composition having a viscosity less than the viscosity of the same composition without the improving agent.

6. A confection composition including cocoa powder, fat and an improving agent in the form of a phosphoric acid ester of glycerine wherein a hydrogen of at least one hydroxy group is replaced by a relatively high molecular weight lipophile group, said ester being devoid of nitrogen linked directly to carbon, and said confection composition having a viscosity less than the viscosity of the same composition without the improving agent.

7. A chocolate composition comprising sugar, cocoa powder and a fat and having included therein a non-nitrogenous ester of phosphoric acid having a relatively high molecular weight lipophile group and a hydrophillic phosphate group.

8. A chocolate composition comprising sugar, cocoa powder and a fat and having included therein a non-nitrogenous phosphoric acid ester of glycerine wherein at least one hydroxy group of the glycerine is esterified with a high molecular weight fatty acid radical.

9. A chocolate composition comprising sugar, cocoa powder and a fat and having included therein a non-nitrogenous phosphoric acid ester of glycerine wherein at least one hydroxy group of glycerine is esterified with a high molecular weight unsaturated fatty acid radical.

10. A chocolate composition comprising sugar, cocoa powder and a fat and having included therein mixed higher fatty acid esters of glycerine, wherein at least one hydroxy group of the glycerine is esterified with a phosphoric acid, the fatty acid being of a type normally present in liquid vegetable oil, and said ester having lipophillic and hydrophillic groups.

11. A confection composition comprising comminuted material dispersed in a fat and including a proportion of a non-nitrogenous phosphoric acid ester of glycerine wherein at least one hydroxy group of the glycerine is esterified with a higher molecular weight unsaturated fatty acid radical.

12. A confection composition comprising comminuted material dispersed in a fat and including a proportion of a non-nitrogenous phosphoric acid ester of glycerine wherein at least one hydroxy group of the glycerine is esterified with a higher molecular weight fatty acid radical.

13. A confection composition comprising comminuted material dispersed in a fat and including a proportion of mixed higher fatty acid esters of glycerine, wherein at least one hydroxy group of the glycerine is esterified with a phosphoric acid, the fatty acid being of a type normally present in liquid vegetable oils, and said esters having lipophillic and hydrophillic groups.

14. The method of improving confection compositions of a type wherein a comminuted material is dispersed in a fat which comprises dispersing in said confection composition a proportion of a non-nitrogenous ester of phosphoric acid having a relatively high molecular weight lipophile group and a hydrophillic phosphate group.

BENJAMIN R. HARRIS.